Figure 1:
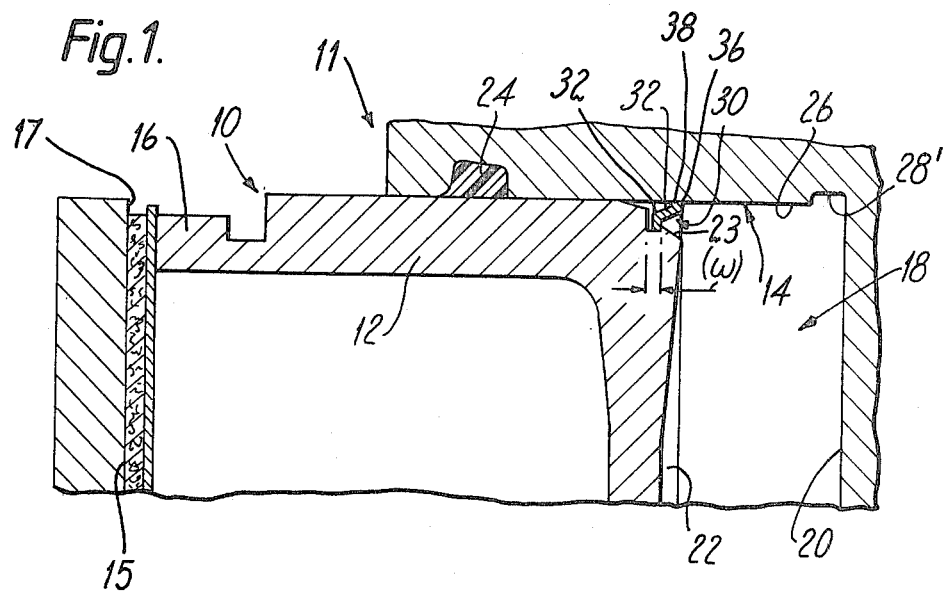

United States Patent [19]

Gregoire et al.

[11] 4,381,047

[45] Apr. 26, 1983

[54] PISTON ANTI-KNOCK BACK ASSEMBLIES

[75] Inventors: Gabriel Gregoire, Asnieres sur Oise; Vincent Robles, Saint Denis; Pedro Alvarez, Moisselles, all of France

[73] Assignee: General Motors Corporation, Detroit, Mich.

[21] Appl. No.: 281,359

[22] Filed: Jul. 8, 1981

[51] Int. Cl.³ .............................................. F16D 55/02
[52] U.S. Cl. ................................ 188/71.8; 188/196 P; 29/453; 29/156.5 R; 92/14; 92/23; 92/30; 92/128
[58] Field of Search .............. 188/196 P, 196 R, 71.8, 188/72.4, 370; 92/172, 246, 14, 23, 30, 128; 29/453, 156.5 R

[56] References Cited

U.S. PATENT DOCUMENTS 3,326,580  6/1967  Munier et al. ........................ 29/453
3,354,992 11/1967  Cook et al. ......................... 188/72.4
3,495,689  2/1970  Peach ................................. 188/72.4

FOREIGN PATENT DOCUMENTS 918206  2/1963  United Kingdom .............. 188/71.8

Primary Examiner—Robert J. Spar
Assistant Examiner—Robert Oberleitner
Attorney, Agent, or Firm—D. D. McGraw

[57] ABSTRACT

A piston anti-knock back assembly in a disc brake assembly having a brake actuator comprising a piston slidably mounted within a cylinder bore and operable to urge a fricton surface into contact with a rotary disc surface upon supply of hydraulic fluid under pressure to said cylinder bore, comprises an expanded resilient split ring in frictional contact with a main portion of the cylinder bore and loosely axially located in an annular piston groove adjacent a conical head of said piston. The resilient ring, when unexpanded, is a sliding fit within the main portion of the cylinder bore, and the outer peripheral portion of the resilient ring is shaped into a frustum of a hollow cone of sufficient depth that, when the ring is placed into contact with an end wall of the cylinder bore, the plane of the ring is spaced far enough away from the end wall to allow insertion of the conical head of the piston within the ring so as to expand the resilient ring up over the conical head portion until it snaps into position in said annular piston groove.

6 Claims, 4 Drawing Figures

PISTON ANTI-KNOCK BACK ASSEMBLIES

This invention relates to piston anti-knock back assemblies in hydraulically actuated brake assemblies, in particular in motor vehicle disc brake assemblies.

Hydraulically actuated motor vehicle disc brake assemblies usually have a brake actuator comprising a piston slidably mounted within a cylinder bore and operable to urge a friction surface into contact with a rotary disc surface on supply of hydraulic fluid under pressure to said cylinder bore. In such arrangements, it is desirable that the piston, upon release of the disc brake subsequent to application of the disc brake, should only retract within the cylinder bore a sufficient distance to ensure that the friction surface is out of contact with the rotary disc surface. Further retraction of the piston beyond this point is unnecessary, since it leads to a requirement for extended travel of a foot pedal associated with the disc brake assembly in order to apply the disc brake. It is desirable therefore to limit the extent to which the piston will retract upon release of the brake, even if exposed to a certain degree of knock-back of the piston within the cylinder due to the rotary disc used in the disc brake assembly not running completely true with respect to the disc brake assembly.

Piston anti-knock back assemblies are known in which there is an annular member loosely mounted upon a piston of a piston and cylinder arrangement, with the annular member being in frictional contact with the cylinder bore. Thus, in operation of the brake, the piston is advanced along the cylinder bore, taking the annular member with it, until application of the brake pad associated with the piston takes place with the member to be braked. Upon release of the brake, the piston retracts within the cylinder bore by an amount governed by the clearance between the piston and the annular member retained thereon, and is then prevented from further retraction within the cylinder bore. An example of such a piston anti-knock back assembly is disclosed in British Pat. No. 865,048. The piston anti-knock back assembly disclosed in this patent, although effective, requires that the piston should be of a somewhat complicated two part structure in order to retain the annular member loosely engaged therewith.

A piston anti-knock back assembly according to the present invention comprises, in a disc brake assembly having a brake actuator comprising a piston slidably mounted within a cylinder bore and operable to urge a friction surface into contact with a rotary disc surface upon supply of hydraulic fluid under pressure to said cylinder bore, said cylinder bore having an enlarged stepped section therein adjacent the end wall of the cylinder bore, an expanded resilient split ring in frictional contact with a main portion of the cylinder bore and loosely axially located in an annular groove adjacent the head of said piston by expanding said ring over a conical frustum of the piston head until said ring snaps into position in said annular groove, the ring, when unexpanded, being a sliding fit within the main portion of the cylinder bore and having abutment spacer means on one side of the ring which, when the unexpanded ring is inserted into the cylinder bore as far as said stepped secton of the bore, contacts said cylinder end wall and maintaining the plane of the ring far enough from the cylinder end wall to allow the conical frustum of the piston head to be thrust through the ring to locate the ring in position in said annular groove.

Preferably the piston anti-knock back assembly according to the present invention is one in which the width of the annular groove in the piston exceeds the axial thickness of the resilient ring by a predetermined amount such that retraction of the piston can occur sufficiently to remove said friction surface from rubbing contact with said rotary disc surface until further retraction of said piston is restrained by said frictional contact between said ring and said cylinder bore.

In a preferred embodiment of the invention, the abutment spacer means on the resilient ring is provided by shaping the outer peripheral portion of the resilient ring into a frustum of a hollow cone. Alternatively, the abutment spacer means on the resilient ring can comprise at least three leg portions extending from said one side of the ring axially of said ring and equispaced about the inner perimeter of said ring.

Advantageously, the outer periphery of the resilient ring has a sharp edge, which, when the ring is expanded into frictional contact with the main portion of the cylinder bore, tends to dig into said main portion of the cylinder bore when the piston is retracted within said cylinder bore. Alternatively, the outer periphery of the resilient ring can be provided with a serrated edge, which, when the ring is expanded into frictional engagement with the main portion of the cylinder bore, tends to dig into said main portion of the cylinder bore when the piston is retracted within said cylinder bore.

Figure 2:
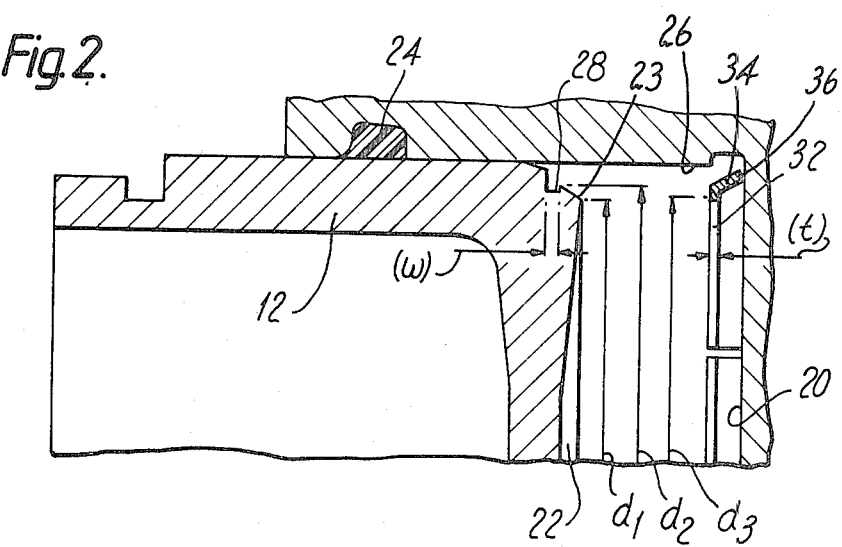
Figure 3:
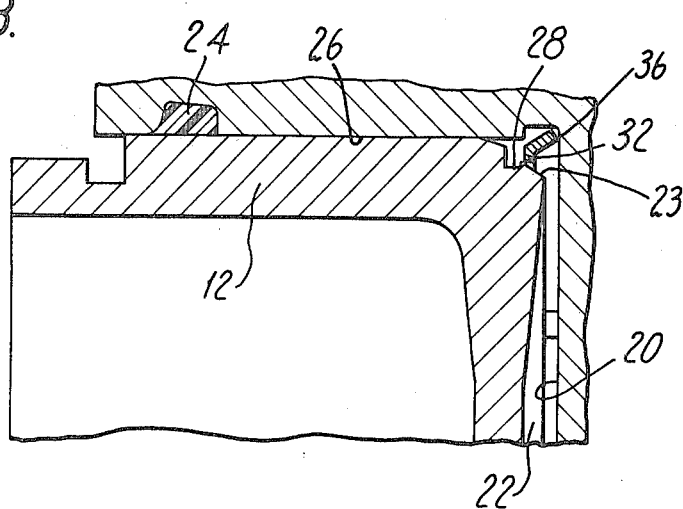
Figure 4:
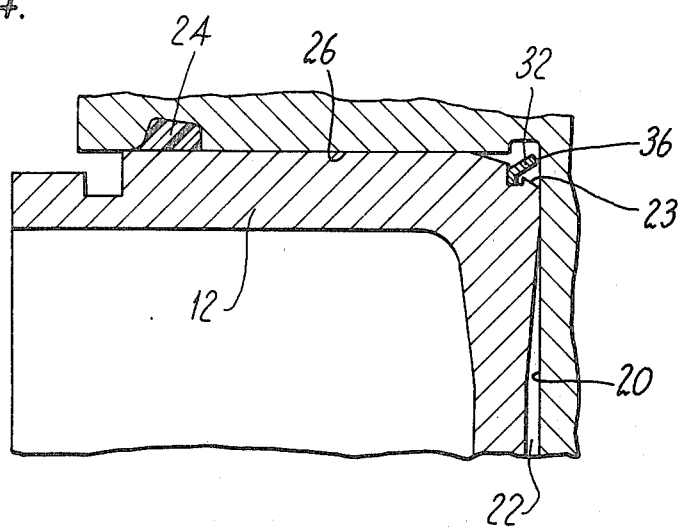

The invention and how it may be performed are hereinafter particularly described with reference to the accompanying drawings, in which:

FIG. 1 is a partial cross sectional view of a brake actuator of a disc brake assembly incorporating an anti-knock back assembly according to the present invention; and FIGS. 2 to 4 show similar views of a partial cross section of the brake actuator shown in FIG. 1, demonstrating the procedure for mounting the anti-knock back assembly in place upon the piston of the brake actuator shown in FIG. 1.

As can be seen in FIG. 1, a brake actuator 10 of a disc brake assembly 11, partially shown, comprises a piston 12 slidably mounted within a cylinder bore 14, and operable to urge a schematically shown friction surface 15 connected to an open end 16 of the piston 12 into contact with a schematically shown rotary disc surface 17 upon supply of hydraulic fluid under pressure to a chamber 18 formed between an end wall 20 of the cylinder bore 14 and a head portion 22 of the piston 12. An annular seal 24 prevents loss of hydraulic fluid from the chamber 18 past the piston 12 and a side wall main portion 26 of the cylinder bore 14. The cylinder bore 14 has an enlarged stepped section 28' formed therein adjacent the end wall 20 of the cylinder bore, for a purpose that will be made apparent later in this description.

The head portion 22 of the piston 12 is formed as a conical frustum 23, and there is an annular groove 28 formed in the piston 12 adjacent the maximum diameter portion of the conical head portion 23 of the piston 12. Annular groove 28 is of a predetermined width (w), as will be discussed hereinafter in the description. As can be seen in FIG. 2 of the accompanying drawings, the conical head portion 23 has a predetermined maximum diameter $d_2$ and a predetermined minimum diameter $d_1$.

Referring again to FIG. 1 of the drawings, the brake actuator 10 is provided with a piston anti-knock back assembly 30 which comprises an expanded resilient split ring 32 which is loosely axially located in the annular groove 28 behind the conical head portion 23 of the piston 12. The outer peripheral portion 34 of the resilient ring 32 is shaped into a frustum of a hollow cone, and its end 36 is in frictional contact with the side wall main portion 26 of the cylinder bore. The thickness of the split ring 32 is designated t, as shown in FIG. 2 of the drawings. The thickness t of the resilient ring 32 is smaller than the width w of the annular groove 28 by a predetermined amount, which corresponds to the desired distance of retraction of the piston 12 within the cylinder bore 14 upon release of the disc brake. As shown in FIGS. 2-4, the outer conical peripheral portion 34 of the resilient ring 32 is provided with a sharp edge at end 36 which will tend to dig into said side wall main portion 26 of the cylinder bore when the piston is retracted within the cylinder bore. Consequently, the coefficient of friction existing between the outer peripheral portion 34 of the resilient ring 32 and the side wall main portion 26 of the cylinder bore is much larger than the coefficient of friction existing between the inner surface of the split ring 32 and the base of the annular groove 28. Consequently, during retraction of the piston 12 upon release of the disc brake, relative movement can occur between the piston 12 and the split ring 32 until the distance (w−t) is taken up and the edge of the groove 28 abuts upon the side of the split ring 32. This relative movement is just sufficient to remove the friction surface 15 associated with the piston 12 from rubbing contact with said rotary disc surface 17. Any further retraction of the piston 12 within the cylinder bore 14 is opposed by the frictional contact of the outer peripheral portion 34 of the resilient ring with the side wall main portion 26 of the cylinder bore 14. The slope of the outer conical peripheral portion 34 of the resilient ring 32 relative to the side wall main portion 26 of the cylinder bore 14 ensures that the frictional contact between this outer conical peripheral portion 34 of the ring 32 and the side wall main portion 26 of the cylinder bore is greater in the direction of retraction of the piston than it is in the opposite direction. Consequently, when wear of the friction surface 15 associated with the piston 12 takes place, this is compensated for by relative movement taking place between the resilient ring 32 and the side wall main portion 26 of the cylinder bore during application of hydraulic pressure to chamber 18 during application of the disc brake. Upon release of the disc brake, the resilient ring 32 remains in its new position, and the retraction movement of the piston 12, obtained in a suitable manner known in the art, is restored to the predetermined distance (w−t).

Installation of the piston anti-knock back assembly 30 in position upon the piston 12 is a simple procedure indicated schematically in FIGS. 2 to 4 of the accompanying drawings. The resilient ring 32, when unexpanded, is a sliding fit within the side wall main portion 26 of the cylinder bore 14. Accordingly, to install the resilient split ring 32 in position within the annular groove 28 of the piston 12, the resilient split ring 32 is first placed in the cylinder bore 14 so that the end 36 of outer conical peripheral portion 34 of this ring contacts the cylinder end wall 20 as shown in FIG. 2. This outer conical peripheral portion 34 maintains the plane of the resilient split ring 32 a predetermined distance from the cylinder end wall 20, which predetermined distance is greater than the height of the conical head portion 23 of piston 12. The internal diameter $d_3$ of the resilient split ring 32 is less than diameter $d_2$, and greater than diameter $d_1$. Piston 12 is then inserted within the main portion 26 of the cylinder bore 14 and pushed down this main portion 26 until the conical head portion 23 of the piston 12 is inserted within the resilient split ring 32, as shown in FIG. 3 of the drawings. Further inward pressure on piston 12 causes the conical head portion 23 to expand the resilient split ring 32 until this resilient split ring snaps into position in said annular groove 28. The diameter of the base of the annular groove 28 is greater than diameter $d_3$ by a predetermined amount sufficient to ensure that the resilient split ring 32 stays expanded by an amount sufficient to give the desired frictional contact between the outer conical peripheral portion 34 of the resilient split ring and the side wall main portion 26 of the cylinder bore. The enlarged stepped section 28' of the cylinder bore 14 is provided to allow room for the resilient split ring 32 to expand as it is forced over the conical head portion 23 of the piston 12 and into position in the annular groove 28, as shown in FIGS. 3 and 4 of the drawings. Pressurization of the chamber 18 with hydraulic fluid then moves the piston 12 outwardly of the cylinder bore 14 until the friction surface 15 associated with piston 12 comes into contact with the rotary disc surface 17. During this process, the expanded resilient split ring 32 leaves the enlarged step section 28' of cylinder bore 14 and is placed in frictional contact with the side wall main portion 26 of the cylinder bore. The movement of the piston 12 relative to the cylinder bore 14 during this brake apply movement effectively positions the resilient split ring 32 in the correct position within the cylinder bore 14 to act as a piston anti-knock back assembly.

If desired, the resilient split ring 32 can be shaped with at least three leg portions defined by generally frusto-conical segments extending axially from one side of, and equispaced about the perimeter of, the resilient split ring, instead of shaping the entire outer peripheral portion 34 of the resilient split ring 32 into a frustum of a hollow cone. In such an instance, each leg portion would be of a longer length than the depth of the conical head portion 23 of piston 12. Similarly, if desired, the outer periphery of the expanded ring can have a serrated edge portion 38, indicated in FIG. 1, to increase the degree of frictional contact between the outer periphery and the side wall main portion 26 of the cylinder bore.

A piston anti-knock back assembly according to the present invention is a simple, yet effective, assembly for obtaining a desired piston anti-knock back arrangement in a disc brake assembly.

The embodiments of the invention in which an exclusive property or privilege is claimed are defined as follows:

1. In a disc brake assembly having a brake actuator comprising a piston slidably mounted within a cylinder bore having a side wall and an end wall, said actuator being operable to urge a friction surface into contact with a rotary disc surface upon supply of hydraulic fluid under pressure to said cylinder bore, said cylinder bore having an enlarged stepped section therein adjacent the end wall of the cylinder bore, a piston anti-knock back assembly comprising:
   said piston having a conical frustum formed head facing the cylinder bore end wall and an annular groove adjacent said head;
   an expanded resilient split ring in frictional contact with a main portion of the cylinder bore side wall, and loosely axially located in said annular groove by expanding said ring over said conical frustum piston head until said ring snaps into position in said annular groove;

said ring, when unexpanded, being a sliding fit within the main portion of the cylinder bore and having abutment spacer means on one side of the ring which, when the unexpanded ring is inserted in the cylinder bore as far as said stepped section of the bore, contacts said cylinder end wall and maintains the plane of the ring far enough from the cylinder end wall to allow said conical frustum piston head to be thrust through the ring to locate the ring in position in said annular groove, said ring frictional contact with the main portion of the cylinder side wall acting so that said ring may be movable by said piston during piston actuated movement but not during piston retractive movement.

2. A piston anti-knock back assembly according to claim 1, in which the width of said piston annular groove exceeds the axial thickness of said resilient ring by a predetermined amount such that retraction of the piston can occur sufficiently to remove the friction surface from rubbing contact with said rotary disc surface until further retraction of said piston is restrained by said frictional contact between said ring and said cylinder bore.

3. A piston anti-knock back assembly according to claim 1, in which the abutment spacer means on said ring is provided by shaping the outer peripheral portion of the resilient ring into a frustum of a hollow cone.

4. A piston anti-knock back assembly according to claim 1, in which the abutment spacer means on said ring comprises at least three leg portions formed as generally frusto-conical segments extending from said one side of the ring axially of said ring and equispaced about the inner perimeter of said ring.

5. A piston anti-knock back assembly according to claim 1, in which the outer periphery of the expanded ring in frictional contact with the main portion of the cylinder bore has a sharp edge tending to dig into said main portion when the piston is retracted within said cylinder bore.

6. A piston anti-knock back assembly according to claim 1, in which the outer periphery of the expanded ring in frictional contact with the main portion of the cylinder bore has a serrated edge tending to dig into said main portion when the piston is retracted within said cylinder bore.

* * * * *